United States Patent
Renold

[15] 3,678,084
[45] July 18, 1972

[54] DEODORIZATION OF FATS
[72] Inventor: Adolph Renold, Somerset, N.J.
[73] Assignee: Colgate-Palmolive Company, New York, N.Y.
[22] Filed: Oct. 27, 1969
[21] Appl. No.: 869,953

Related U.S. Application Data

[63] Continuation of Ser. No. 566,493, July 20, 1966.

[52] U.S. Cl. ..........................................260/424
[51] Int. Cl. .........................................C11b 3/04
[58] Field of Search ................................260/424

[56] References Cited

UNITED STATES PATENTS

| | | | |
|---|---|---|---|
| 1,964,875 | 7/1934 | Freiburg | 260/424 |
| 2,272,964 | 2/1942 | Coe et al. | 210/203 |
| 2,842,577 | 7/1958 | Stern et al. | 260/428.5 |
| 3,052,701 | 9/1962 | Hampton | 260/419 |
| 3,239,547 | 3/1966 | Brion et al. | 260/428 |

Primary Examiner—Lewis Gotts
Assistant Examiner—Ethel G. Love
Attorney—Ronald S. Cornell, Murray M. Grill, Herbert S. Sylvester, Thomas J. Corum and Robert L. Stone

[57] ABSTRACT

A composition and process for the purification of fats and oils employing a mixture of fat soluble strong acid, an acidic clay, and a carbohydrate.

8 Claims, No Drawings

DEODORIZATION OF FATS

This application is a continuation of my copending application Ser. No. 566,493, filed on July 20, 1966.

The present invention relates in general to the purification of fats and oils and, more particularly, to a process for deodorizing fats and oils used in the production of soap. This invention is especially useful for the treatment of low-grade fatty materials comprising, for example, fat from beef, mutton, pork, chicken, or coconuts and mixtures of said fatty materials. Soaps produced from such treated fats are substantially, if not completely free of malodors, and remain pleasant smelling over prolonged periods.

Numerous prior methods of deodorizing crude oils and fats are based on the attempted removal of malodorous components. In earlier used processes, for example British Pat. No. 16,954, dated A.D. 1892 steam stripping is used. This step is supplemented in British Pat. No. 8,854, dated A.D. 1841 by clarifying the resultant fat by heating it in the presence of sulfuric acid.

It is also conventional to remove from fats suspended and dissolved matter comprising meat scraps, proteinaceous matter, carbohydrates, and certain phosphatides by heating the fat either in the presence of an adsorbent or an acid, such as sulfuric or phosphoric acid (H. G. Kirschenbauer, "Fats and Oils," Second Edition, 72, Reinhold Publishing Company, New York, 1960). In the event the latter acid process is used, the mixture of fat and acid is heated to about 100° C. for a short time and is then treated by settling and removal of the acid layer.

Though the foregoing methods of refining raw fats and oils have sought to improve the odor of these materials, the odoriferous impurities were not satisfactorily removed, and an impasse was reached as to what further treatment was necessary. From the methodological standpoint, the solution to the problem of reducing the content of odor-yielding substances has been stymied because the composition of many odoriferous bodies is unknown. Available analytical tests are incapable of determining the origin of all the deleterious odors, and in particular, whether then odor-forming bodies in animal fats are derived from particular fatty acid constituents of the fat or from possible trace amounts of bone and/or proteinaceous materials therein.

A particularly serious disadvantage in any of the above-described methods of refining animal and vegetable derived fats is that soaps produced therefrom retain objectional malodors. Moreover, even freshly prepared fat-derived soaps of high quality with a pleasant odor may emanate malodors after commercially unavoidable periods of storage. Therefore, it has heretofore been necessary to perfume strongly fat-derived soaps to cover the odor introduced by malodor precursors even after the soaps have been specially treated to remove odoriferous materials therefrom.

It is therefore a principal object of this invention to provide a process of refining animal and vegetable fats to improve the odor thereof.

A further object of the invention is to provide an improved process of removing from animal and vegetable fats precursors of undesirable odor bodies therein.

A still further object is to provide novel compositions of matter used in such processes.

It is yet another object of this invention to provide a pleasant smelling fat-derived soap which remains free of malodors even after long periods of storage.

These and other objects and advantages of the invention will become apparent by reference to the following description and appended claims.

It has been discovered that the odor of crude fats and oils can be successfully improved by the process of the present invention which comprises a novel chemical treatment of the fats.

It has been discovered that the smell of crude commercial fats, as well as treated fats can be improved by treating the same with a novel deodorizing composition which includes a mixture of a fat-soluble strong acid, a carbohydrate having at least one free hydroxy group, and an acidic clay. These components, when employed in combination, are found to act synergistically in converting the odor-forming bodies in fats into volatile and readily adsorbable materials.

The acid should be soluble at the melting point of the fat, preferably to the extent of at least 0.5 g. per 1000 g. of fat. Furthermore, it is preferred to use an acid having a pH in a 1 percent aqueous solution at 25° C. of from 1 to 3, more preferably less than 2.4. Although any fat-soluble strong acid can be used having these characteristics, it is desirable to employ an acid which will not adversely affect the color of the fat and which has a relatively low vapor pressure at the temperature at which the molten tallow is processed, i.e., the normal boiling point or decomposition temperature is preferably higher than the maximum temperature at which the fat is processed, and more preferably at least 50° higher. The acids found particularly suitable include $\alpha$-sulfo-fatty acids, such as $\alpha$-sulfopalmitic acid, and $\alpha$-sulfostearic acid; organohalogenic acids, such as mucochloric acid; dicarboxylic acids, such as acetylene dicarboxylic acid and maleic acid; and the alkyl dihydrogen phosphates, such as amyl dihydrogen phosphate and lauryl dihydrogen phosphate. All of the foregoing acids must also comply with the preceding requirements of solubility, stability, and vapor pressure.

Without being bound by an explanation of the mechanism of the action of the constituents of the deodorizing composition with impurities in the fat, it is believed that the fat-soluble acid serves both to hydrolyze protein fragments to components which become steam distillable or resinify under the influence of acidity, steam, and temperature. It is also possible that the carboxyl portions of the protein-like hydrolyzate react with the hydroxyl groups of the carbohydrate. In the event sugars having a terminal aldehyde group are used as the carbohydrate, there may be a condensation of the amino group of the amino acids with the aldehyde moiety of the sugar. Functional groups of amino acids, other than the amino group, can also react with sugars. The combination of fat-soluble strong acid and carbohydrate functions synergistically to hydrolyze and convert the odor-forming bodies, as well as the potential odor-yielding bodies, into both steam-strippable fragments and other fragments which are readily removable by adsorption on acidic clay.

Among the numerous carbohydrates suitable for use in the synergistic composition, it is desirable to use modified and unmodified polysaccharides, particularly effective carbohydrates being starches, such as etherified corn starch, etherified potato starch, or regular corn starch. The odor of the fats is also improved when the carbohydrate is a sugar, such as monosaccharides, for example a pentose or hexose, or else, a disaccharide, such as maltose or sucrose. It is believed that the added carbohydrates are at least partially hydrolyzed by the fat-soluble acid into mono- and disaccharides. The free hydroxyl groups of the carbohydrates may then react with the amino acid hydrolyzates in the acid media, and the resulting compounds can be more easily separated from the fat. Mixtures of said carbohydrates may also be used.

Protein fragments and carbohydrates adducts of lower volatility which remain in the fat after steam stripping are adsorbed onto an acid clay which forms a part of the present deodorizing composition. In this synergistic composition, the clay forms an important constituent, and the treatment of fats with only the fat-soluble strong acid and the carbohydrate effects little or no reduction of the malodor thereof.

Suitable clays include bentonite, montmorillonite, kaolin, and other naturally occurring acidic clays, the most suitable having a pH of 4 or below when the clay is added in a concentration of 1 percent to water at 25° C. In some cases, it is desirable to use acid-activated clays to increase the adsorption thereof. Acid activation is normally accomplished by treating a slurry of clay and water with a mineral acid, such as hydrochloric or sulfuric acid. The mixture is then treated with steam for a period of about 5 to 6 hours and is thereafter washed and filtered. The teachings of U.S. Pat. No. 3,052,701 are incorporated herein by reference. Reference is also made to KirkrOthmer "Encyclopedia of Chemical Technology,"

First Edition, Vol. 4 page 55 (1954), for a further description of artificially acid-activated clays.

In addition to the removal of odoriferous materials from the fats, the acid clays also aid in the physical filtration and removal of extraneous colloidal matter. Fats having an objectionable color are also beneficially treated with acid clays which generally constitute from 0.05 to 10 percent, preferably 0.1 to 1.0 percent by weight of the fat being treated.

When the fatty material to be deodorized contains relatively large amounts of undesirable heavy metals which have not been previously eliminated, it is desirable to use a sequestering agent to reduce the activity of the metal ion to a level sufficiently low for the ion to be considered essentially inactive. Sequestering agents are found particularly desirable when deodorizing crude animal-derived fats which usually contain iron, and traces of copper and other heavy metals. These metal impurities are believed to catalyze the potentially odor-yielding materials to form odor-forming bodies; consequently, a reduction in the activity of these metallic ions in the tallow correspondingly reduces their effect in producing odor-forming bodies.

The sequestering agents found particularly suitable are the alkali salts of ethylenediaminetetracetic acid, sodium α-glucoheptonate, hydroxyethyl ethylenediaminetetracetic acid trisodium salt (= Versenol 120 by Dow) and other sequestering agents which will reduce the activity of the particular metallic ions in the fat. When the fatty material contains a particularly high concentration of an undesirable metal, the sequestering agent used is preferably selective for that particular metal impurity under the reaction conditions.

In the production of soaps from fatty materials, it is conventional to add to tallow varying amounts of vegetable oils, such as coconut oil. Therefore, the amount of the deodorizing composition added to the crude fats can be varied, depending upon the type of fat being used and the quantity of impurities therein. In any event, the deodorizing composition generally comprises 0.2 to 3 percent, preferably 0.8 to 1.2 percent by weight of the fat mixture being treated. A higher quantity of deodorizing composition can be used, but a loss of fat will occur due to adherence onto the clay which is later filtered off.

The deodorizing composition includes preferably 2 to 10 percent, more preferably 4 to 5 percent by weight of a fat-soluble strong acid; preferably 3 to 15, more preferably 8 to 10 percent by weight of a carbohydrate, the balance being an acidic clay.

The deodorizing composition is added to either crude fats or treated fats which are in the liquid phase. Then, steam and an inert gas, such as nitrogen, carbon dioxide, or argon, are usually passed through the resulting mixture, the temperature of the fat being elevated to the range of between 100° and 125° C. The fat is thus treated, while stirring, for desirably 0.5 to 2 hours or until the malodors are removed, and then a small amount of base, e.g., sodium hydroxide solution, is optionally added to neutralize the fat-soluble acid and the clay.

The steam serves to heat the molten fat and carry away vaporized odor-forming bodies therefrom in vacuo or at atmospheric pressure. If no vacuum equipment is available, it is desirable to pass a small amount of nitrogen through the fat during steaming to blanket the fat and reduce contact thereof with the oxygen of the air. The inert gas stream can also replace the steam in whole or in part, and in such instances, the temperature of the fat can be elevated above 125° C.

After the foregoing deodorization treatment is completed, it is desirable to add a mixture, such as clay and charcoal, to the fat to aid in decolorizing the same.

The deodorizing process described hereinbefore is generally applicable for materials comprising vegetable and animal fats, and in particular to such materials which contain less than about 0.009 percent, preferably less than 0.003 percent protein nitrogen (as determined by the Kjeldahl method). By animal fat is meant fat previously rendered from different animal species, preferably avian and mammalian species. The deodorizing process of this invention is particularly applicable for removing residual malodors from enzyme-treated crude animal fats obtained from slaughter houses and butcher shops, these fats normally containing small amounts of proteinaceous material. This enzyme treatment is described in detail in copending application Ser. No. 566,485 filed July 20, 1966 and having a common inventor and the same assignee.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

To demonstrate the synergistic effect of the fat-soluble strong acids, the carbohydrate, and the acidic clay, eighteen experiments were conducted wherein Experiments 4–6 omitted the acid, and Experiments 1–3, 13, 14, and 18 omitted the starch. As can be seen from the results shown in the appended Table I, there is definitely a synergistic effect between the starch and the acid when in combination with the acid clay. This is clearly seen from the fact that Experiment 3 with a 9 percent acid concentration yields a malodor value of only 2.5; Experiment 6 wherein no acid is employed but a 15 percent concentration of esterified potato starch is used, yields a malodor value of 2.7; but in Experiment 8, wherein only 4.5 percent acid is employed and 9.0 percent starch, the malodor value is reduced to 1.0, and the color is also markedly improved.

The deodorization procedure was as follows: In a stainless steel beaker, 600 g. fat were carefully stirred and heated to 100° C., then nitrogen passed through the fat, 1 percent or 6 g. catalyst additive added, then temperature raised and maintained at 113°–117° C., and, during one hour, 60 cc water gradually added below the fat surface. After all the water was added, the caustic was added in the same manner, the mixture maintained at 117°–125° for 10 minutes, then 2 percent or 12 g. of bleach (a mixture of 5 parts Florida clay and 1 part Norit charcoal) added, nitrogen addition discontinued, the mixture stirred at this temperature for 20 minutes, and filtered hot two times through filter paper. All evaluations were made on the twice filtered fat.

The results in Table 1, appended hereto, were determined as follows:

a. Fat Color: The color of the molten fat was determined in a 5¼ inches Lovibond cell, using a Lovibond Tintometer, Type D, available from Hayes G. Shimp, Inc., Albertson, Long Island, New York. The fat color is measured to predict the quality of the soap to be produced therefrom. Since this test is less reliable than the saponification color test, both tests were made.

b. Saponification Color: Using the Lovibond Tintometer, the saponification color was determined according to L. O'-Daniel and L.B. Parsons, "Oil and Soap," 20, 72 (1943). In this test, the higher the R-value, the grayer and less desirable are the resultant soap chips and finished soaps.

c. Malodor Determination: To 240 grams of fat were added 1.5 grams α-sulfostearic acid and the resultant mixture was charged into a 1-liter three-necked vacuum flask. The flask was then evacuated, the contents stirred with a magnetic mixer, and heated to 145°–155° C. While maintaining a vacuum of 0.5 to 2.0 mm Hg, 100 ml water were gradually added over a period of one hour, the water being added below the surface of the fat and the steam distillate collected in two dry ice - acetone traps. The distillate was neutralized with potassium hydroxide to remove traces of fatty acids carried over by the steam, and then extracted with 150 ml re-distilled hexane. The neutral hexane solution was concentrated in a Vigreaux distilling column to exactly 6 ml. From this concentrate, 2, 4, 8, 12, and 16 microliter portions each were pipetted with a graduated syringe onto 7 cm diameter filter paper placed in 8 oz. jars. The malodor strength in each jar was determined organoleptically and compared with a similarly produced concentrate from a fat usually found in high-quality soaps, the latter concentrate being used as a standard and assigned a malodor value = 1. Because all of the malodorous distillates tested exhibited a surprisingly similar type of odor which varied mainly in the strength of the malodor, the relative malodor of the fats treated could be easily ascertained. The higher the malodor value shown in Table 1, the more disagreeable the fat odor and the poorer the odor and perfume stability of soaps made from such fats.

d. Filterability: This was gauged both by the rate of fat filtration through the bleach-catalyst cake and by the amount of fat retained in the filter cake after vacuum filtration.

EXAMPLE 2

In this example, untreated raw fats are deodorized. To 1000 parts by weight of a molten mixture of 80 percent crude tallow and 20 percent crude coconut oil, there was added with slow stirring 5 parts by weight of a powdered mixture having the following composition:
  5.0 percent α-sulfostearic acid,
  10.0 percent modified potato starch,
  2.7 percent sodium α-glucoheptonate sequesterant,
  82.3 percent kaolin.

Steam was passed through the resulting mixture for one hour while the temperature was maintained at 100°–130° C. The acidity of the mixture was then reduced by adding 1.5 parts by weight of 22° Be sodium hydroxide solution at 90°–100° C. Then, 15 parts by weight of a standard mixture of clay and charcoal was added to the solution, and the mixture was stirred for 20 minutes at 100°–120° C. and filtered.

The product fat was of a good color, odor, and stability and low in heavy metals, such as iron. This fat was found to exhibit less malodors than fat treated with only 2 percent of the same clay-carbon mixture.

EXAMPLE 3

To 1500 grams of a molten mixture of 80 parts by weight crude tallow and 20 parts by weight crude coconut oil were added 15 grams (1 percent) of the following composition:
  45 parts amyl dihydrogen phosphate
  90 parts corn starch, crude
  860 parts natural Texas bentonite Nitrogen was passed through the stirred mixture and the temperature of the fat raised to 114°–116° C. While steam was added, stirring continued for one hour, then 2 percent plant bleach 92 percent of the fat present) was added thereto and stirring again continued at 114°–116° C. for 30 minutes. The now anhydrous mixture was filtered and the resulting fat exhibited 70 percent less malodors than the same fat treated with 2 percent clay-carbon mixture only.

EXAMPLE 4

To 1500 g. of a molten mixture of 80 parts by weight crude tallow and 20 parts by weight crude coconut oil were added 15 grams (1 percent) of the following composition:
  45 parts butyl dihydrogen phosphate
  90 parts corn starch, crude
  860 parts natural, acidic Texas bentonite Carbon dioxide was passed through the stirred mixture and the temperature of the fat raised to 114°–116° C. Stirring was continued and steam added during one hour. Then the steam and the carbon dioxide were discontinued and the temperature lowered to 60°–65° C. A fat of improved odor was obtained.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be within the full range of equivalence of the following claims.

TABLE 1.—DEODORIZATION OF AN 80 PARTS TALLOW, 20 PARTS COCONUT OIL MIXTURE

| Experiment number | Additives (=1 part additive mixture for 100 parts fat) | | Percent bentonite | Percent 26 Be sodium hydroxide solution | Bleach[1] percent of fat | Resultant fat properties[2] | | | | | Evaluation, color, odor, filterability |
|---|---|---|---|---|---|---|---|---|---|---|---|
| | Acid | Starch | | | | Fat | | Saponification | | Malodor value | Filterability |
| | | | | | | | Color | | Color | | |
| 1 | 2.0% alpha-sulfo stearic | | 98.0 | 0.2 | 2 | 2.5R | 20Y | 11.1R | 70Y | 3.0 | Good |
| 2 | 4.5% alpha-sulfo stearic | | 95.5 | 0.4 | 2 | 3.0R | 20Y | 12.5R | 70Y | 2.75 | do |
| 3 | 9.0% alpha-sulfo stearic | | 91.0 | 0.8 | 2 | 3.0R | 35Y | 10.0R | 70Y | 2.5 | Poor |
| 4 | | 4.5% etherified potato | 95.5 | 0.2 | 2 | 1.8R | 14Y | 9.9R | 70Y | 3.0 | Good |
| 5 | | 9.0% etherified potato | 91.0 | 0.2 | 2 | 2.2R | 19Y | 10.0R | 70Y | 3.0 | Good |
| 6 | | 15.0% etherified potato | 85.0 | 0.2 | 2 | 2.1R | 19Y | 13.5R | 70Y | 2.75 | do |
| 7 | 2.0% alpha-sulfo stearic | 9.0% etherified potato | 89.0 | 0.2 | 2 | 2.1R | 20Y | 10.5R | 70Y | 2.0 | do |
| 8 | 4.5% alpha-sulfo stearic | 9.0% etherified potato | 86.5 | 0.4 | 2 | 3.0R | 20Y | 11.0R | 70Y | 1.0 | do | Poor odor. |
| 9 | 9.0% alpha-sulfo stearic | 9.0% etherified potato | 82.0 | 0.8 | 2 | 3.3R | 50Y | 12.0R | 35Y | 1.0 | Poor | Best all around. |
| 10 | 4.5% alpha-sulfo stearic | 4.5% etherified potato | 91.0 | 0.4 | 2 | 3.3R | 50Y | 10.0R | 50Y | 1.5 | do | Poor color. |
| 11 | 4.5% alpha-sulfo stearic | 15.0% etherified potato | 80.5 | 0.4 | 2 | 2.9R | 30Y | 12.1R | 70Y | 1.0 | do | |
| 12 | 4.5% alpha-sulfo stearic | 9.0% etherified potato | 86.5 | 0.4 | 2 | 1.5R | 10Y | 10.1R | 50Y | 1.25 | Good | |
| 13 | 3.0% amyldihydrogen phosphate | | 97.0 | 0.4 | 2 | 2.1R | 15Y | 15.5R | 70Y | 2.5 | Fair | |
| 14 | 6.0% amyldihydrogen phosphate | | 94.0 | 0.8 | 2 | 2.5R | 25Y | 20.0R | 70Y | 2.0 | Poor | |
| 15 | 3.0% amyldihydrogen phosphate | 9.0% corn starch, pearl | 88.0 | 0.4 | 2 | 1.6R | 20Y | 16.0R | 70Y | 1.25 | Good | |
| 16 | 3.0% amyldihydrogen phosphate | 9.0% corn starch, pearl | 88.0 | | | 1.5R | 10Y | 14.5R | 70Y | 1.25 | do | |
| 17 | 4.5% alpha-sulfo stearic | 9.0% corn starch, pearl | 86.5 | | | 1.5R | 15Y | 12.1R | 70Y | 1.0 | do | Second best. |
| 18 | 9.0% alpha-sulfo stearic | | 81.0 | 0.4 | 2 | 7.2R | 70Y | 17.0R | 70Y | 1.0 | do | Poor color. |

[1] Bleach mixture: 5 parts decolorizing clay plus 1 part decolorizing carbon.
[2] Because of the sodium hydroxide treatment listed, no free fatty acids were determined in the finished fat.
[3] 26 Be KOH sol.

What is claimed is:

1. In a process for improving the odor of a material consisting essentially of fats selected from the group consisting of animal fats, vegetable fats, and mixtures thereof, the improvement comprising the step of treating said material at a temperature between about 100° C. and 125° C. with 2-10 percent of a fat-soluble strong acid selected from the group consisting of $\alpha$-sulfofatty acids, organohalogenic acids, dicarboxylic acids, alkyl dihydrogen phosphates, and mixtures thereof, 75-95 percent of an acidic clay, and 3-15 percent of a carbohydrate having at least one free hydroxyl group, said fat-soluble strong acid being soluble in fats to the extent of at least 0.5 g. of said acid per 1000 g. of fat, and said acid having a pH of 1-3 in a one percent aqueous solution at 25° C.

2. A process as defined by claim 1 wherein the material is treated with a mixture of, in percent by weight, 4-5 percent fat-soluble strong acid, 85-88 percent acidic clay, and 8-10 percent carbohydrate.

3. A process as defined by claim 1 wherein said mixture is employed in an amount comprising 0.2 - 3 percent by weight of the fats being treated.

4. A process as defined by claim 1, further comprising steam stripping said material during said treating.

5. A process as defined by claim 4, further comprising passing an inert gas through said material during said treating.

6. A process as defined by claim 1 wherein said carbohydrate is starch.

7. The process of claim 1 wherein the carbohydrate is a sugar selected from the group consisting of mono- and disaccharides.

8. In a process for improving the odor of a material consisting essentially of fats selected from the group consisting of animal fats, vegetable fats, and mixtures thereof, the improvement comprising the step of treating said material, at a temperature between about 100° and 125° C. and while passing steam or an inert gas therethrough, with 2-10 percent of a fat-soluble strong acid selected from the group consisting of $\alpha$-sulfopalmitic acid, $\alpha$-sulfostearic acid, mucochloric acid, acetylene dicarboxylic acid, maleic acid, and alkyl dihydrogen phosphates, and mixtures thereof, 75-95 percent of an acidic clay, and 3-15 percent of a carbohydrate selected from the group consisting of corn starch, pentose, hexose, maltose, sucrose and mixtures thereof.

* * * * *